(12) United States Patent
Syse

(10) Patent No.: US 7,124,779 B2
(45) Date of Patent: Oct. 24, 2006

(54) DEVICE FOR FASTENING A MANOEUVRABLE PLUG FOR PLUGGING OF PIPES

(75) Inventor: Harad Syse, Røyneberg (NO)

(73) Assignee: Plugging Specialists International ASA, Stavanger (NO)

( * ) Notice: Subject to any disclaimer, the term of this patent is extended or adjusted under 35 U.S.C. 154(b) by 0 days.

(21) Appl. No.: 10/518,763

(22) PCT Filed: Jun. 19, 2003

(86) PCT No.: PCT/NO03/00204

§ 371 (c)(1),
(2), (4) Date: Dec. 21, 2004

(87) PCT Pub. No.: WO2004/003422

PCT Pub. Date: Jan. 8, 2004

(65) Prior Publication Data

US 2005/0263200 A1 Dec. 1, 2005

(30) Foreign Application Priority Data

Jun. 26, 2002 (NO) .................................. 20023099

(51) Int. Cl.
*F16L 55/12* (2006.01)
(52) U.S. Cl. .............................. 138/89; 138/90; 138/93; 405/170
(58) Field of Classification Search ................. 138/90, 138/89, 93; 405/170; 411/55, 65; 92/165 R
See application file for complete search history.

(56) References Cited

U.S. PATENT DOCUMENTS

| | | | | |
|---|---|---|---|---|
| 2,607,370 A * | 8/1952 | Anderson | ...................... | 138/90 |
| 2,974,685 A * | 3/1961 | Ver Nooy | ...................... | 138/90 |
| 3,943,982 A * | 3/1976 | Lecordier | ...................... | 138/89 |
| 4,332,277 A * | 6/1982 | Adkins et al. | ................ | 138/89 |
| 4,422,477 A * | 12/1983 | Wittman et al. | .............. | 138/89 |
| 4,465,104 A * | 8/1984 | Wittman et al. | .............. | 138/89 |
| 4,498,811 A * | 2/1985 | Fern et al. | ............... | 405/168.1 |
| 4,602,500 A * | 7/1986 | Kelly | .......................... | 73/49.8 |
| 4,658,860 A * | 4/1987 | Reaux | ......................... | 138/89 |
| 4,875,615 A * | 10/1989 | Savard | ........................ | 228/119 |
| 5,797,431 A * | 8/1998 | Adams | ........................ | 138/89 |
| 6,241,424 B1 * | 6/2001 | Bath et al. | .................. | 405/156 |
| 6,581,642 B1 * | 6/2003 | Ritchie et al. | ................ | 138/90 |
| 6,732,762 B1 * | 5/2004 | Russell | ........................ | 138/89 |

FOREIGN PATENT DOCUMENTS

GB 2286868 8/1995

* cited by examiner

*Primary Examiner*—Patrick Brinson
(74) *Attorney, Agent, or Firm*—Onsagers AS

(57) ABSTRACT

Arrangement at a plug for sealing liquid- or gas-carrying pipes, comprising several slips (15) arranged peripherally on the plug, so as to allow them to be pushed up along a conical force ring (25) by means of a hydraulic cylinder (5), where the slips (15) are provided with a possibly divided sliding surface (19, 19') and at least one possibly divided sliding surface (20, 23) having an angle that differs from the angle of the sliding surface (19, 19'). The force ring (25) has sliding surfaces (27, 29, 29', 31) that correspond to the sliding surfaces (19, 19', 20, 23) of the slips. The first part of the sliding surfaces (20, 23, 27, 31) has a steep gradient and the second part of the sliding surfaces (21, 21', 29, 29') has a small gradient.

6 Claims, 2 Drawing Sheets

DEVICE FOR FASTENING A MANOEUVRABLE PLUG FOR PLUGGING OF PIPES

This invention regards a device for fastening a manoeuvrable plug for plugging of pipes, specified more particularly as lock slips with a stepped sliding surface.

When maintaining and possibly developing pipelines, e.g. for transport of petroleum products, it is necessary to be able to shut down longer or shorter sections of a piping system.

In its simplest form, prior art comprises fixed valves that are closed and opened on demand.

Such valves constitute a significant increase in costs when constructing the piping system. To some extent it is difficult to predict where to position the valves in order to allow the piping system to be shut down in the correct place. Consequently there is a risk that the use of valves will be excessive, or that the valves will be positioned in the wrong place. Excessive use of valves results in unnecessary capital costs, and the wrong placement leads to complications and additional work in connection with shut down of the piping system.

A valve that is left unused for a long period will also carry a risk of malfunction when it is put to use.

A valve represents a throttling of the piping system. This results in pressure loss, wear on the pipe due to cavitation etc., and problems connected with inspection equipment passing through valve openings.

Valves have to a large extent been replaced by plugs that are positioned and locked in the piping system by use of various means. A plug is normally propelled through the pipe by the medium that normally flows in the piping system.

In its simplest operating form a plug is operated by use of a direct connection between the plug and the control system. Cables, wires and hoses are pulled along into the piping system, so as to allow the plug to be locked upon reaching the correct position.

Generally, there is a risk involved in pulling such transmission systems into the piping system. Damage to a cable or similar may cause the placement of a plug to fail, or the subsequent removal of the plug will be extra demanding.

Remotely operated plugs with wireless signal transmission have eliminated the main problem associated with the directly operated type of plug. A wireless-operated plug carries with it all power sources for operation of internal cylinders, valves, radio systems etc. by containing batteries, hydraulic oil, propellant gases and similar. By arranging an antenna on the outside of the pipe in which the plug is to be fixed, the control signals are transmitted from the control system to the plug.

A plug is typically constructed with one or more sections. In a main section, which is to form the seal in the pipe, a number of concentric components are assembled. An end plate combined with a peripheral gasket constitutes the actual sealing element. Peripherally positioned slips fasten the plug against the pipe walls when the slips are forced outwards by an axially positioned hydraulic cylinder and co-operating, sloping slide and pressure faces. The piston rod of the cylinder is coupled to one end plate of the plug. In the plug there are devices that among other things operate the hydraulic cylinder.

Connected to the main section there may be several control sections containing recording and operating equipment for positioning etc. Several main sections may also be interconnected together in order to achieve the desired effect. Interconnection is achieved by coupling articulated stays to the centre of the end face of a section.

In order for a plug to be able to move through a pipe of the diameter for which the plug is intended, there must be a minimum clearance between the periphery of the plug and the pipe wall. This clearance depends on the dimensional tolerances of the pipe, typically a minimum of 10 mm for oil and gas pipes. Both large and small plugs must have approximately the same clearances. The slips that are forced against the pipe wall for fastening the plug must therefore, during their travel along the sloping slide faces, travel at least 10 mm in the radial direction. With the underside of today's slips and the corresponding slide faces having a steadily sloping shape, the length of the slip is proportional to the gradient of the slide surface. Typically, this is 17 degrees, regardless of the diameter of the plug.

Plugs of a small diameter must be able to pass through pipe bends with a smaller turning radius than plugs of a larger diameter. Consequently, it is important that a small diameter plug can be manufactured with a small structural length. With currently known techniques, it is difficult to produce a plug with sufficiently short structural dimensions.

The object of the invention is to remedy the disadvantages of known techniques.

The object is achieved in accordance with the invention by the characteristics given in the description below and in the appended claims.

The slips that are placed peripherally on the main section of a plug are positioned with their highest ends abutting a sloping pressure face on one end plate of the plug. The slips abut a conical force ring and are held against the force ring by means of e.g. tension springs. The sliding surface between the slip and the force ring is formed with two gradients, by a first section of the sliding surface having a steep gradient and the second section a lesser gradient, typically 17 degrees. The different gradients of the sliding surfaces form a stepped pattern. The stepped pattern of the slips and the force ring correspond when the slips are in the starting position. Advantageously, the sliding surfaces comprise one or more recesses in order to achieve an increased stability of the slips in the starting position, during the sliding motion and in the locked position.

When the cylinder of the plug pushes the end plates of the plug together, the slips will, as a result of the steeply ascending sliding surfaces and the insignificant radial load on the slips during the first stage of the displacement, jump up onto the higher step in order to then move along the sliding surfaces with a lesser gradient. This makes it possible to achieve, in the first stage of movement, a large displacement of the slips in the radial direction with a small axial displacement. Thus the length of the slip may be reduced considerably and the structural length of the plug reduced correspondingly, such as is desirable for small diameter plugs.

The following describes a non-limiting example of a preferred embodiment illustrated in the accompanying drawings, in which.

Figure 1:
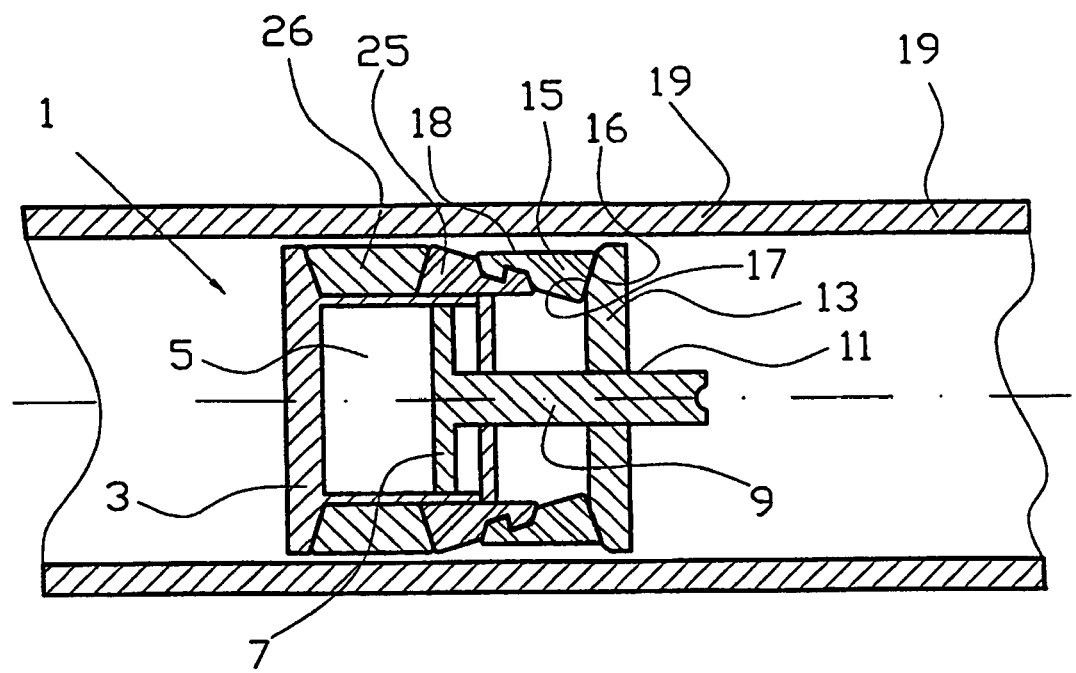
FIG. 1 shows a section through the main section of a plug.
Figure 2:
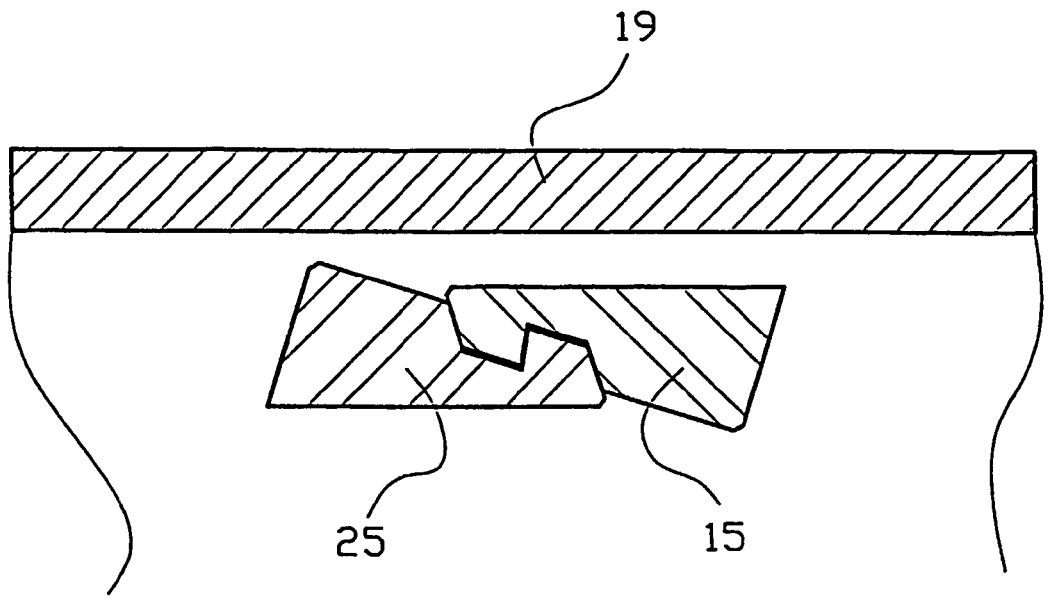
FIG. 2 shows, on a larger scale, a section through a slip in the position of rest on a corresponding force ring.
Figure 3:
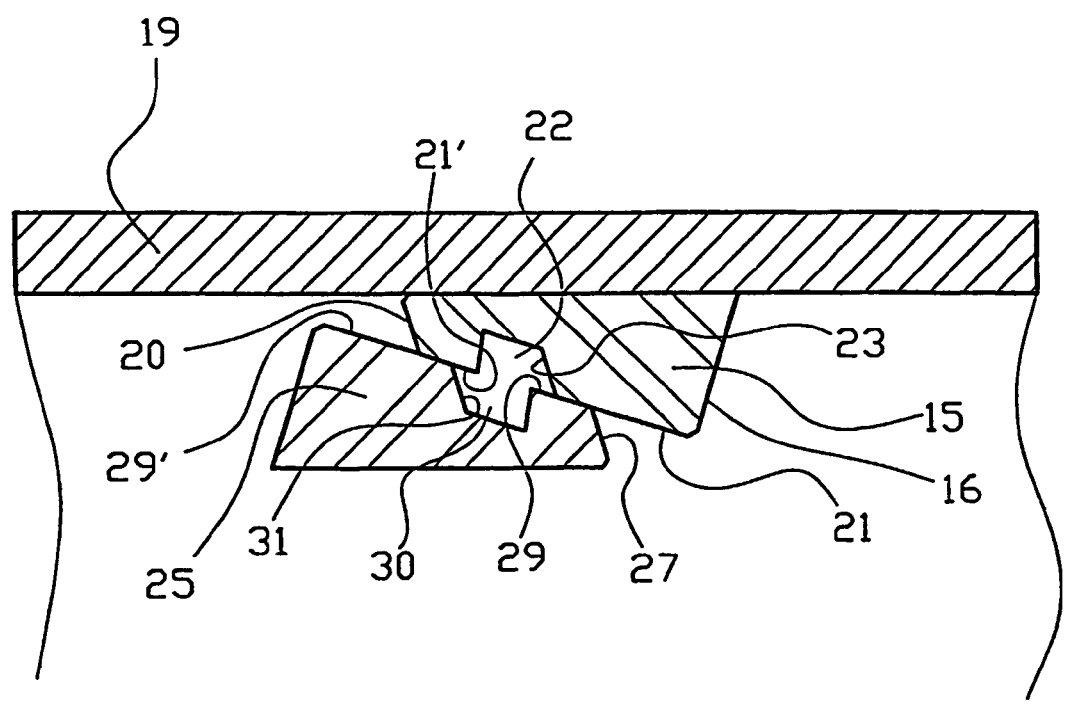
FIG. 3 shows, on the same scale, a slip forced out against a pipe wall.

In the drawings, reference number 1 denotes a main section equipped with a first end plate 3, into which a hydraulic cylinder 5 has been integrated. The hydraulic cylinder 5 comprises a piston 7 and a piston rod 9. One end 11 of the piston rod is connected to the second end plate 13 of the plug. For operation of the hydraulic cylinder 5 there is provided a hydraulic pump (not shown) and valves (not shown).

Along the periphery of the plug there are several slips 15 abutting the sloping pressure face 17 of the second end plate 13 via their ends 16. The face of the slips end 16 corresponds to the gradient of the compression face 17. The top of the slip forms a plugging face 18 shaped so as to give it a good grip when pressed against a pipe wall 19. The underside of the slip 15 comprises a slip front 20 and a sliding surface 21, 21'. The sliding surface 21, 21' is divided by a slip recess 22 extending in parallel with the slip front 20, and where the side that faces the same way as the slip front 20 forms a step front 23 with the same direction as the slip front 20.

The surface of a conical force ring 25 comprises a force ring front 27 and a sliding surface 29, 29'. The sliding surface 29, 29' is divided by a force ring recess 30 extending in parallel with the force ring front 27, and where the side that faces the same way as the force ring front 27 forms a step front 31 with the same direction as the force ring front 27.

A gasket 26 is arranged peripherally between the force ring 21 and first end plate 3. The pipe wall 19 encloses the plug. When the slips 15 are disposed on the lower part of the force ring 25, the underside of the slips correspond to the conical surface of the force ring, so that the sliding surface 21' of the slip 15 coincides with the bottom of the force ring recess 30 and the bottom of the slip recess 22 coincides with the sliding surface 29' on the force ring 25.

A plug is used to seal liquid- or gas-carrying pipes by the plug being inserted into the pipe and propelled by the liquid or gas pressure. It may also be propelled by a built-in driving mechanism and associated wheels for rolling on. The plug is fastened by operation of the hydraulic cylinder 5 of the main section 1. The end plates 3, 13 connected to the cylinder 5 are pulled together, and the slips 15 arranged on the periphery of the main section 1 are forced against the conical force ring 25 by the compression face 17. The slip front 20 and the step front 23 of the slip 15 are pressed against the step front 31 of the force ring 25 and the force ring front 25 respectively, so as to cause the slip to be lifted up onto the sliding surfaces 29, 29'. Then the slips 15 are pushed along the sliding surfaces 29, 29' of the force ring 25 until the slips 15 are forced against the pipe wall 16. During the fastening sequence, the gasket 23 is also compressed and forced outwards, so as to completely seal the pipe together with the first end plate 3.

The invention claimed is:

1. A plug for sealing liquid- or gas-carrying pipes, comprising several slips (15) arranged peripherally on the plug, so as to allow them to be pushed up along a conical force ring (25) by means of a hydraulic cylinder (5), characterized in that the slips (15) are provided with at least one slip sliding surface (21, 21') and at least one slip front sliding surface (20, 23) having an angle relative to a longitudinal axis of the plug that differs from the angle of the slip sliding surface (21, 21') relative to the same axis, where the slips (15) are arranged to engage an inner surface of the pipe in a gripping position while in abutment against an angled surface of the force ring (25) which is not parallel with the longitudinal axis of the plug.

2. A plug in accordance with claim 1, characterized in that the conical force ring (25) is equipped with at least one force ring sliding surface (29, 29') and at least one force ring front sliding surface (27, 31) having an angle relative to the longitudinal axis of the plug that differs from the angle of the force ring sliding surface (29, 29') relative to the same axis.

3. A plug in accordance with claim 2, characterized in that the slip and force ring front sliding surfaces (20, 23, 27, 31) have a steep gradient relative to the longitudinal axis of the plug and that the slip and force ring sliding surfaces (21, 21', 29, 29') have a small gradient relative to same axis.

4. A plug in accordance with claim 2 or 3, characterized in that the slip front sliding surface (20, 23) and slip sliding surface (21, 21') have a shape that in a given position of the slips (15) corresponds to the force ring front sliding surface (27, 31) and force ring sliding surface (29, 29').

5. A plug in accordance with claim 1, characterized in that the slips (15) comprise a first slip front sliding surface (20) and the slip sliding surface (21, 21') is divided by a slip recess (22) that extends in a radial direction similar to the first slip front sliding surface (20), whereby a surface immediately adjacent to the recess forms a second slip front sliding surface (23) parallel to the first slip front sliding surface (20).

6. A plug in accordance with claim 2, characterized in that the conical force ring (25) comprises a first force ring force sliding surface (27) and the force ring sliding surface is divided by a force ring recess (30) extending in a radial direction similar to the first force ring front sliding surface (27), whereby a surface immediately adjacent the recess forms a second force ring front sliding surface (31) parallel to the first force ring front sliding surface (27).

* * * * *